US012717175B2

(12) United States Patent
Abbey et al.

(10) Patent No.: US 12,717,175 B2
(45) Date of Patent: Aug. 25, 2026

(54) SPACER FOR EYE FRAMES

(71) Applicants: Christian Abbey, Costa Mesa, CA (US); Blake Davis, Newport Beach, CA (US); Zach Porteous, Newport Beach, CA (US)

(72) Inventors: Christian Abbey, Costa Mesa, CA (US); Blake Davis, Newport Beach, CA (US); Zach Porteous, Newport Beach, CA (US)

( * ) Notice: Subject to any disclaimer, the term of this patent is extended or adjusted under 35 U.S.C. 154(b) by 280 days.

(21) Appl. No.: 18/422,868

(22) Filed: Jan. 25, 2024

(65) Prior Publication Data

US 2025/0244616 A1 Jul. 31, 2025

(51) Int. Cl.
*G02C 13/00* (2006.01)
*G02C 5/22* (2006.01)

(52) U.S. Cl.
CPC ............. *G02C 13/001* (2013.01); *G02C 5/22* (2013.01)

(58) Field of Classification Search
CPC ........... G02C 13/001; G02C 5/22; G02C 5/10
USPC ............................................ 351/41, 42, 153
See application file for complete search history.

(56) References Cited

U.S. PATENT DOCUMENTS 2,210,507 A * 8/1940 Spill .................... G02C 5/2209 351/116
2,671,379 A * 3/1954 Eloranta .................. G02C 5/22 351/111
3,744,886 A * 7/1973 Filitz .................... G02C 5/2254 351/113
5,418,581 A * 5/1995 Conway ............... G02C 5/2209 351/116
6,099,120 A * 8/2000 De Lima .............. G02C 5/2209 351/140
6,679,604 B1 * 1/2004 Bove ........................ G02C 5/22 351/153
10,634,933 B2 * 4/2020 Linossier ............... G02C 5/146
2005/0225717 A1 * 10/2005 Reane .................. G02C 5/2209 351/153
2017/0219844 A1 * 8/2017 Goodger ................ G02C 5/126
2018/0044555 A1 * 2/2018 Kigami ...................... C09J 9/00
2018/0129077 A1 * 5/2018 Hunt ...................... G02C 11/02
2020/0278564 A1 * 9/2020 Thorsell ................... G02C 1/08
2022/0390761 A1 * 12/2022 Thorsell ................... G02C 5/22
2023/0132107 A1 * 4/2023 Minoura .................... C09J 7/38 428/220
2023/0132305 A1 * 4/2023 Nishiwaki ............ C08K 5/0041 428/355 AC
2024/0019719 A1 * 1/2024 Yokoyama .............. B24B 51/00
2024/0201514 A1 * 6/2024 Zemer ...................... G02C 5/14
2024/0302676 A1 * 9/2024 Stutelberg ................ G02C 5/20

* cited by examiner

*Primary Examiner* — William R Alexander

(74) *Attorney, Agent, or Firm* — Patent 360; Barry Choobin

(57) ABSTRACT

A spacer for tightening loose arms of an eye frame. The eye frame includes a pair of arms coupled to a front frame using hinge joints. The spacer can be inserted within the hinge joints for biasing the arms inwards. The spacer includes a body having adhesive layer on front face or a rear face thereof. The adhesive layer is protected by a release liner.

3 Claims, 3 Drawing Sheets

SPACER FOR EYE FRAMES

FIELD OF INVENTION

The present invention relates to a spacer for eye frames, and more particularly, the present invention relates to a spacer for keeping the arms of an eye frame in a tense state.

BACKGROUND

Eyewear, such as eyeglasses, sunglasses, and the like typically has a pair of arms for keeping the eyewear in position and preventing the same from sliding out when worn by a user. The arms, also referred to as earpieces, are made to have some inward tension so that the arms can press against the head to keep the eyewear in position and secured. However, the amount of tension is little so that it does not cause any discomfort to the user. However, with the usage over time, the eyewear becomes loose, and starts to drop or slide from the ears. A user is typically advised to buy a new set of eyewear or get the frame of the eyewear replaced. Changing the frame or getting a new set of eyewear, both options can be costly. Also, a user may not desire to switch the frame because of any personal reason or preference, A need is therefore appreciated for a device that can help tighten up the loosen eye frames.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is directed to a spacer for an eye wear that can bias the loosen arms of the eye frame towards the tensed state.

Another object of the present invention is that the spacer is economical to manufacture.

Still another object of the present invention is that the spacer can easily retrofit into existing eyewear.

Yet another object of the present invention is that the spacer can be easy to install.

A further object of the present invention is that the amount of tension in the eye frame can be varied.

An additional object of the present invention is that any modification in the eyewear is not needed.

In one aspect, disclosed is a method of tightening loose arms of an eye frame, the arms coupled to a front frame of the eye frame using hinge joints, the method comprises providing a spacer, the spacer comprises a body, the body has a front face, a rear face, and a wall extending between the front face and the rear face, wherein a height of the wall defines a thickness of the body; and inserting the spacer within a left hinge joint of the hinge joints, wherein the spacer is sandwiched between a proximal end portion of the front frame and an end of a left arm of the arms of the eye frame.

In one aspect, the spacer can be made from elastic material, such as foam that can be compressed. This may allow inserting the spacer into the hinge joint.

In one aspect, two spacers can be provided for two hinge joints in the eyewear. The two spacers can be of same thickness or different thickness.

In one aspect, a single spacer can be provided for a damaged hinge joint of the eyewear.

In one aspect, the spacer further includes an adhesive layer disposed on one of two opposite faces, and the adhesive layer is protected by release liner. The method further comprises removing the release liner before inserting the spacer. The front face adheres to the proximal end portion of the front frame and the rear face adheres to the end of the left arm. The method further comprises providing a second spacer and inserting the second spacer between a right hinge joint of the hinge joints. It is to be noted that the adhesive can be disposed on either face of the spacer, however, it is critical that only one face has the adhesive layer while the other face is plain. Preferably, the adhesive can be disposed on the front face of the body.

In one aspect, disclosed is a spacer for an eye frame, the eye frame comprises a pair of arms coupled to a front frame using hinge joints, the spacer comprises a body, the body has a front face, a rear face, and a wall extending between the front face and the rear face, wherein a height of the wall defines a thickness of the spacer, wherein the spacer is configured to be inserted within a hinge joint of the hinge joints and sandwich between an end portion of the front frame and an end of an arm of the pairs of arms of the eye frame. The spacer further comprises an adhesive layer disposed on the front face or the rear face. The adhesive layer is protected by release liner.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
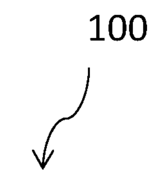
FIG. 1 is a perspective view of a spacer for an eye frame, according to an exemplary embodiment of the present invention.
Figure 1:
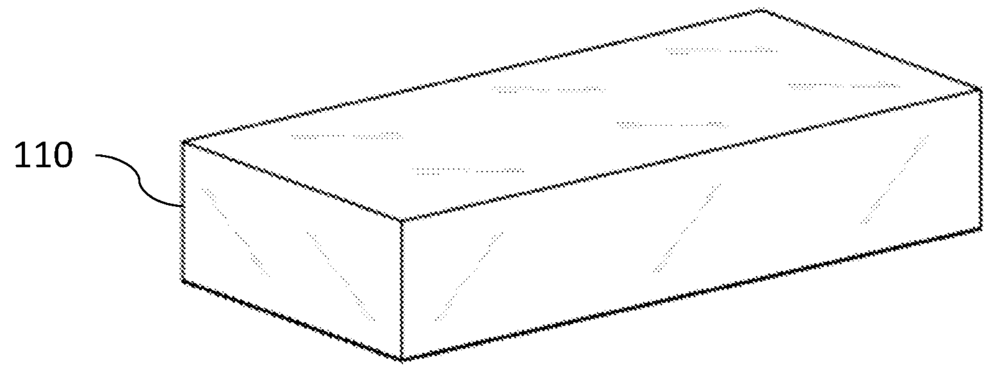

The subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word “exemplary” is used herein to mean “serving as an example, instance, or illustration.” Any embodiment described herein as “exemplary” is not necessarily to be construed as preferred or advantageous over other embodiments. Likewise, the term “embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be outlined to provide a thorough understanding of the subject innovation. It may be evident, however, that the claimed subject matter may be practiced without these specific details. In other instances, well-known structures and apparatus are shown in block diagram form to facilitate describing the subject innovation.

Disclosed are a spacer and a method for adjusting tension in the arms of an eye frame. Examples of the eye frame include that of eyeglasses, sunglasses, and the like. In such eye frames, the arms are coupled to the front frame of the eye frame through hinge joints. The hinge joints allow for the folding of the arms when the eyewear is not in use. The hinge joints also impart some inward bias to the arms so that the arms can press against the head when the eyewear is worn. This keeps the eyewear secured over the head of the user and prevents the eyewear from dropping or sliding out. The amount of tension imparted by the hinge joints gradually decreases due to wear and tear.

The disclosed spacer can be used to correct the loosened, bent, or damaged hinge joints of the eye frame. It is to be noted that the term frame herein refers to the eye frame of an eyewear, and the eye frame includes a pair of arms coupled to the front frame using hinge joints. The term eyewear herein includes eyeglasses, sunglasses, and the like.

Figure 2:
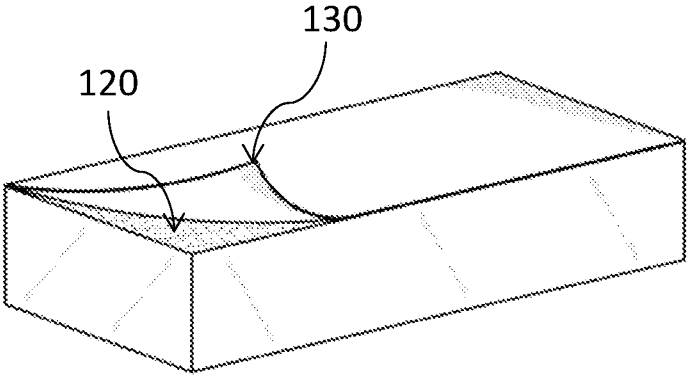
FIG. 2 is another perspective view of the spacer in which a portion of the liner is removed to show the adhesive layer, according to an exemplary embodiment of the present invention.
Figure 3:
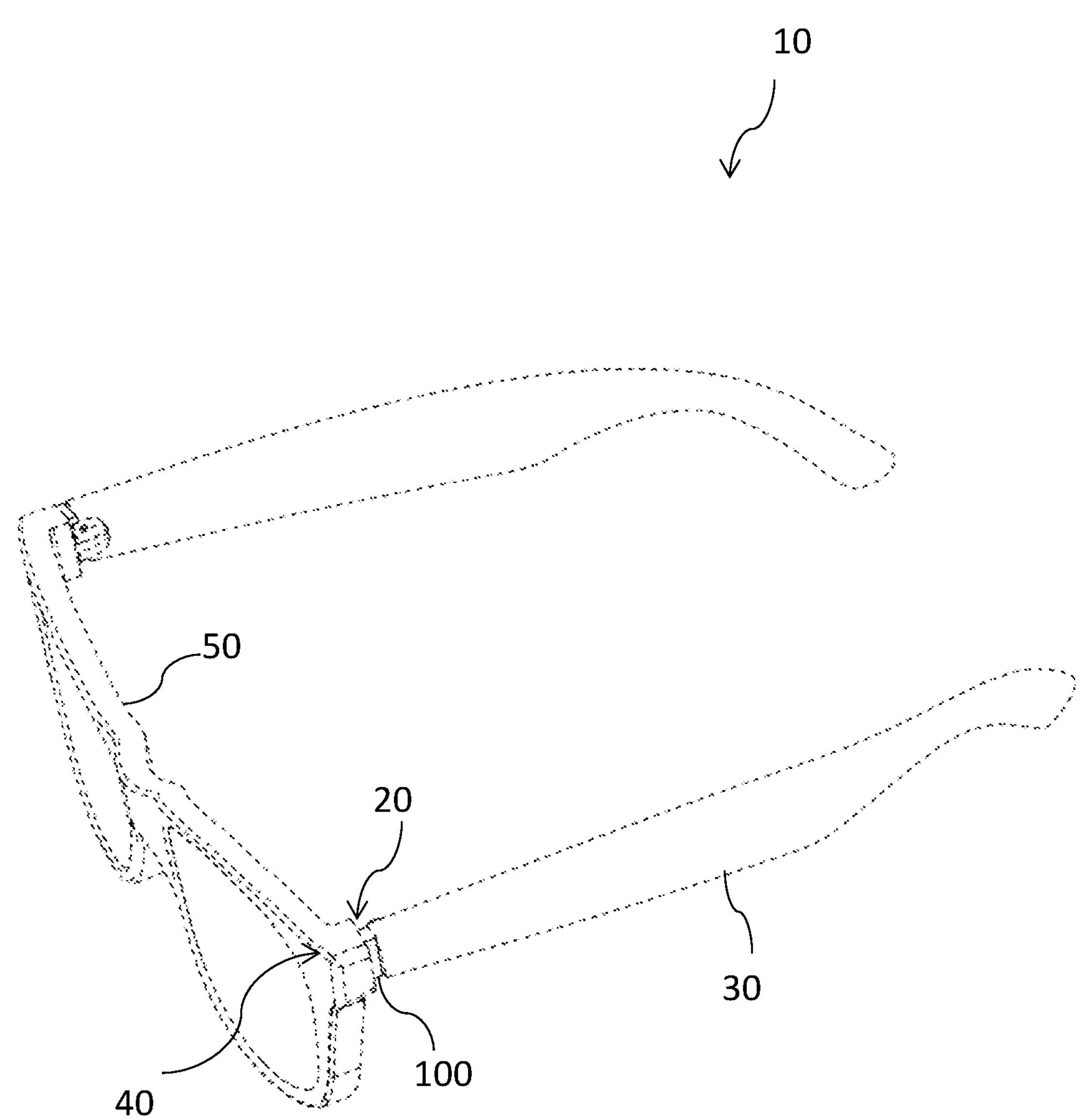
FIG. 3 shows the spacer in a use condition, according to an exemplary embodiment of the present invention.

Referring to FIGS. 1-3, FIG. 1 show a perspective view of a spacer 100, FIG. 2 show the adhesive layer 120 and a liner 130 of the spacer 100, FIG. 3 shows the spacer is use condition, wherein the eye frame 10 is shown. The disclosed spacer 100 includes a body 110 having a front face and a rear face. A wall extends between the front face and the rear face, wherein the height of the wall defines the thickness of the spacer. The thickness of the spacer could be varied without departing from the scope of the present invention.

The adhesive can be disposed over the front face of the body. However, the adhesive can be disposed on either the front face or the rear face, without departing from the scope of the present invention. It is to be noted that only one face of the body can have the adhesive while the other face can be plain.

The adhesive allows the spacer to remain secured within hinge joint space 20 wherein the front face can adhere to an end portion 40 of the front frame 50 and the rear face of the spacer can face an end of the arm 30. In this case, the adhesive is disposed on the front face of the spacer. The adhesive layer can be protected using a release liner 130. For use, the release liner can be removed, and the spacer can be installed within the hinge joint of the eye frame. The thickness of the spacer can be proportional to the amount of inward tension in the arms of the eye frame. To manipulate the tension, the first spacer from the eye frame can be removed and the spacer of a different thickness can be installed.

The spacer according to the present invention can be provided in a variety of shapes, and variation in the shape is within the scope of the present invention. For example, the spacer can be manufactured in a square shape, star space, rectangular shape, and the like. In certain implementations, all walls of the spacer can be equal. For example, the spacer can be cuboid or cube in shape. In certain embodiments, the right wall of the spacer can be longer than the rear wall. Thus, the spacer may be sloped and wherein this slope may help adjusting the spacer within the hinge joint. The longer side wall of the spacer (thicker side) may be on the outer side exposed while the shorter side wall may contact the hinge joint.

The body of the spacer can be manufactured from a lightweight material, such as foam, rubber, and the like. Preferably, the material of the spacer may have certain compressibility or softness. For example, a soft rubber as a material of spacer may be preferred over the hard rubber. The compressibility may allow inserting the spacer into the hinge joint with ease.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method of tightening loose arms of an eye frame, the arms coupled to a front frame of the eye frame using hinge joints, the method comprises:

providing a spacer, the spacer comprises a body, the body has a front face, a rear face, and a wall extending between the front face and the rear face, wherein a height of the wall defines a thickness of the body, an adhesive layer disposed on the front face of the body, the adhesive layer is protected by a release liner;

removing the release liner before inserting the spacer;

inserting the spacer within a left hinge joint of the hinge joints, wherein the spacer is sandwiched between a proximal end portion of the front frame and an end of a left arm of the arms of the eye frame, wherein the front face adheres to the proximal end portion of the front frame and the rear face adheres to the end of the left arm.

2. The method of claim 1, wherein the method further comprises:

providing a second spacer; and inserting the second spacer within a right hinge joint of the hinge joints.

3. A spacer for an eye frame, the eye frame comprises a pair of arms coupled to a front frame using hinge joints, the spacer comprises:

a body, the body has a front face, a rear face, and a wall extending between the front face and the rear face, wherein a height of the wall defines a thickness of the spacer, wherein the spacer is configured to be inserted within a hinge joint of the hinge joints and sandwich between an end portion of the front frame and an end of an arm of the pairs of arms of the eye frame;

an adhesive layer disposed on the front face; and a rear adhesive layer disposed on the rear face, wherein the adhesive layer is protected by a release liner.

* * * * *